(12) United States Patent
Schmidt et al.

(10) Patent No.: US 8,103,632 B2
(45) Date of Patent: Jan. 24, 2012

(54) SELF-CONTAINED PARTIAL DATABASE BACKUPS

(75) Inventors: Steven R. Schmidt, Redmond, WA (US); Gregory Smith, Durango, CO (US)

(73) Assignee: Microsoft Corporation, Redmond, WA (US)

( * ) Notice: Subject to any disclaimer, the term of this patent is extended or adjusted under 35 U.S.C. 154(b) by 321 days.

(21) Appl. No.: 11/113,161

(22) Filed: Apr. 22, 2005

(65) Prior Publication Data

US 2006/0242205 A1 Oct. 26, 2006

(51) Int. Cl.
*G06F 7/00* (2006.01)

(52) U.S. Cl. .......................... 707/647; 707/646
(58) Field of Classification Search .................. 707/204, 707/640, 646, 647
See application file for complete search history.

(56) References Cited

U.S. PATENT DOCUMENTS

| | | | | |
|---|---|---|---|---|
| 5,535,381 A * | 7/1996 | Kopper | | 710/52 |
| 5,649,196 A * | 7/1997 | Woodhill et al. | | 707/204 |
| 5,794,242 A * | 8/1998 | Green et al. | | 707/10 |
| 5,924,102 A * | 7/1999 | Perks | | 1/1 |
| 6,035,412 A * | 3/2000 | Tamer et al. | | 714/6 |
| 6,170,055 B1 * | 1/2001 | Meyer et al. | | 713/2 |
| 6,366,987 B1 * | 4/2002 | Tzelnic et al. | | 711/162 |
| 6,651,077 B1 * | 11/2003 | East et al. | | 707/204 |
| 2001/0034737 A1 * | 10/2001 | Cane et al. | | 707/204 |
| 2002/0091710 A1 * | 7/2002 | Dunham et al. | | 707/200 |
| 2005/0144283 A1 * | 6/2005 | Fatula | | 709/226 |
| 2005/0228836 A1 * | 10/2005 | Bacastow et al. | | 707/204 |

OTHER PUBLICATIONS

Green et al., Digital Technical Journal, vol. 8, No. 2, pp. 32-45, 1996.*
Whitaker et al. Digital Technical Journal, vol. 8, No. 2, pp. 15-31, 1996.*
Johnson et al. Digital Technical Journal, vol. 8, No. 2, pp. 5-14, 1996.*

* cited by examiner

*Primary Examiner* — Cheyne Ly
(74) *Attorney, Agent, or Firm* — Woodcock Washburn LLP

(57) ABSTRACT

Methods and computer readable media for restoring a database. In a method, a backup of a subset of a database is created, where the subset includes a filegroup and database metadata describing the filegroup. The database is then restored using the database subset. In a computer-readable medium, a first data field contains data representing a database subset having at least one of a plurality of filegroups. A second data field contains data representing database metadata that describes the filegroup. In another method, archived database metadata and an archived filegroup that is one of a plurality of filegroups is accessed, and the filegroup is brought online using the database metadata.

9 Claims, 4 Drawing Sheets

SELF-CONTAINED PARTIAL DATABASE BACKUPS

FIELD OF THE INVENTION

The present invention relates generally to database systems and, more particularly, to database backup and restoration.

BACKGROUND OF THE INVENTION

Databases are used in a variety of contexts and often contain large quantities of valuable information. For example, databases may be used in commercial applications, such as electronic commerce, to process customer orders for merchandise, to maintain customer financial information and so forth. Periodically, information contained within a database may be backed up to a non-volatile storage medium to preserve the information in the event the database goes offline in an uncontrolled manner, such as due to a power failure or system error. Typically, it is important to bring such a database online as quickly as possible so as to reduce errors and, potentially, lost business and revenue. For example, an operator of a database that is used in electronic commerce will want the database to come back online quickly so the database can continue to manage orders and thereby generate revenue for the operator.

Conventionally, restoration of a database is accomplished by backing up all of the database's filegroups to some form of non-volatile storage. After a fault occurs and the database goes offline, the database can be brought back online by restoring all of the filegroups from storage as well as any database metadata that is used to access the information contained in each filegroup. Because all filegroups within such a database must be restored before any access to the database is permitted, there may be a long delay before the database is brought back online. In the case of very large databases and/or databases that have a large number of filegroups, the delay may be particularly pronounced. Conventionally, the requirement that all database filegroups be restored prior to bringing a database back online cannot be waived even in situations where the database's most critical information is stored only in a few, or even one, filegroup. Thus, a conventional method for restoring a database may delay bringing a database back online while such a method restores relatively unimportant filegroups. Furthermore, the requirement that all filegroups be restored prior to bringing a database online necessitates that each filegroup be backed up in its entirety to enable each such filegroup to be restored.

Accordingly, there is a need for a mechanism that enables a database to return to an online status without having fully restored all of its filegroups. The present invention satisfies this need.

SUMMARY OF THE INVENTION

In view of the foregoing shortcomings and drawbacks, the invention is directed to methods and computer readable media for restoring a database. In one such method, a backup of a subset of a database is created, where the subset includes a filegroup and database metadata describing the filegroup. The database is then restored using the database subset. In a computer-readable medium, a first data field contains data representing a database subset having at least one of a plurality of filegroups. A second data field contains data representing database metadata that describes the filegroup. In another method, archived database metadata and an archived filegroup that is one of a plurality of filegroups is accessed, and the filegroup is brought online using the database metadata.

Additional features and advantages of the invention will be made apparent from the following detailed description of illustrative embodiments that proceeds with reference to the accompanying drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings example constructions of the invention; however, the invention is not limited to the specific methods and instrumentalities disclosed. In the drawings.

DETAILED DESCRIPTION OF ILLUSTRATIVE EMBODIMENTS

The subject matter of the present invention is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

Example Computing Environment

Figure 1:
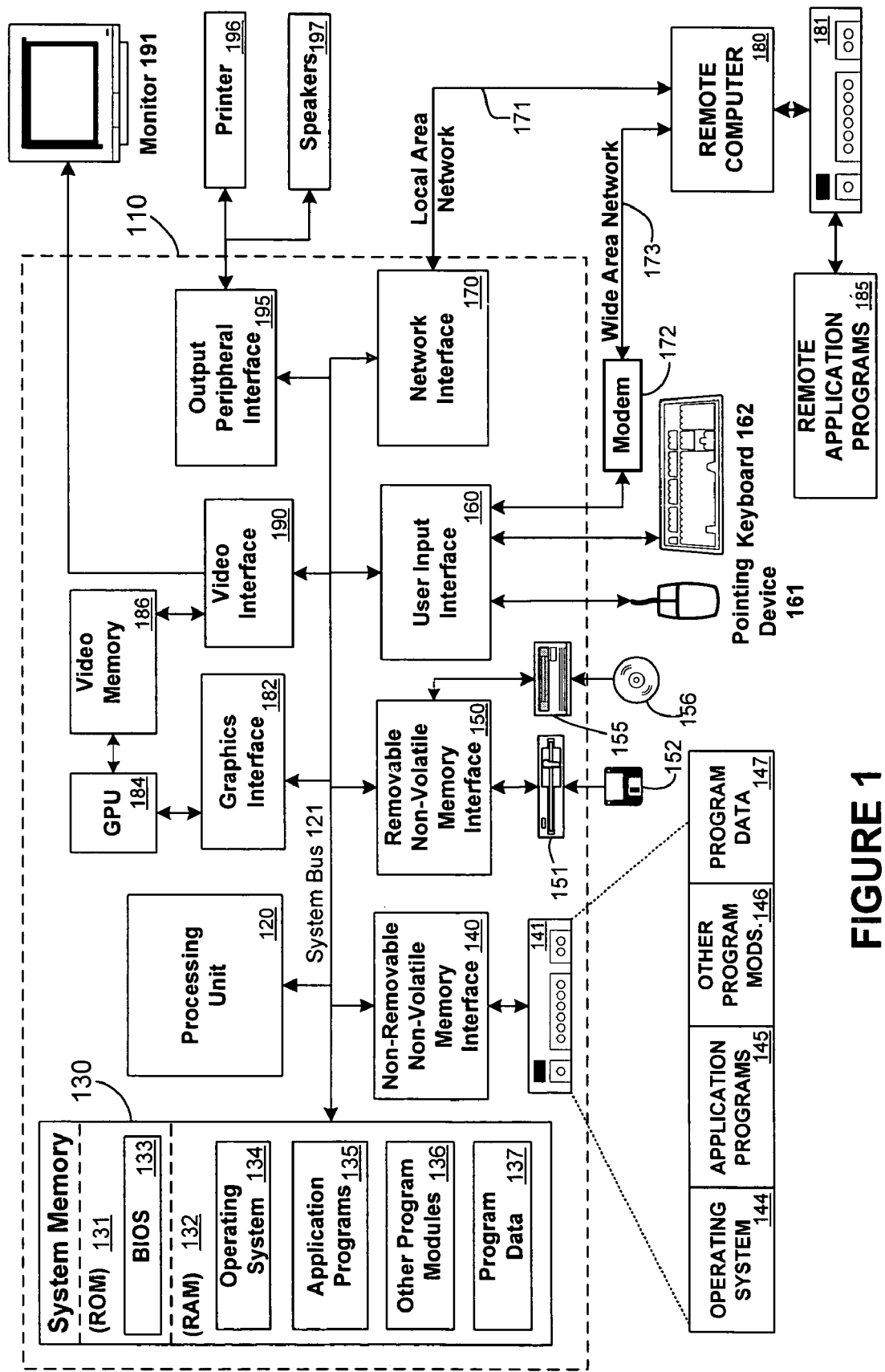
FIG. 1 is a diagram illustrating an example computing environment in which aspects of the invention may be implemented.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the example operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. Typically the functionality of the program modules may be combined or distributed as desired in various embodiments. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an example system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read-only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the example operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146 and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Example Distributed Computing Frameworks or Architectures

Various distributed computing frameworks have been and are being developed in light of the convergence of personal computing and the Internet. Individuals and business users alike are provided with a seamlessly interoperable and web-enabled interface for applications and computing devices, making computing activities increasingly web browser or network-oriented.

For example, MICROSOFT®'s .NET platform includes servers, building-block services, such as web-based data storage, and downloadable device software. Generally speaking, the .NET platform provides (1) the ability to make the entire range of computing devices work together and to have user information automatically updated and synchronized on all of them, (2) increased interactive capability for web sites, enabled by greater use of XML rather than HTML, (3) online services that feature customized access and delivery of products and services to the user from a central starting point for the management of various applications, such as e-mail, for example, or software, such as Office NET, (4) centralized data storage, which will increase efficiency and ease of access to information, as well as synchronization of information among users and devices, (5) the ability to integrate various communications media, such as e-mail, faxes, and telephones, (6) for developers, the ability to create reusable modules, thereby increasing productivity and reducing the number of programming errors, and (7) many other cross-platform integration features as well.

While example embodiments herein are described in connection with software residing on a computing device, one or more portions of the invention may also be implemented via an operating system, API, or middleware software between a coprocessor and requesting object, such that services may be performed by, supported in, or accessed via all of NET's languages and services, and in other distributed computing frameworks as well.

Network Environment

Figure 2:
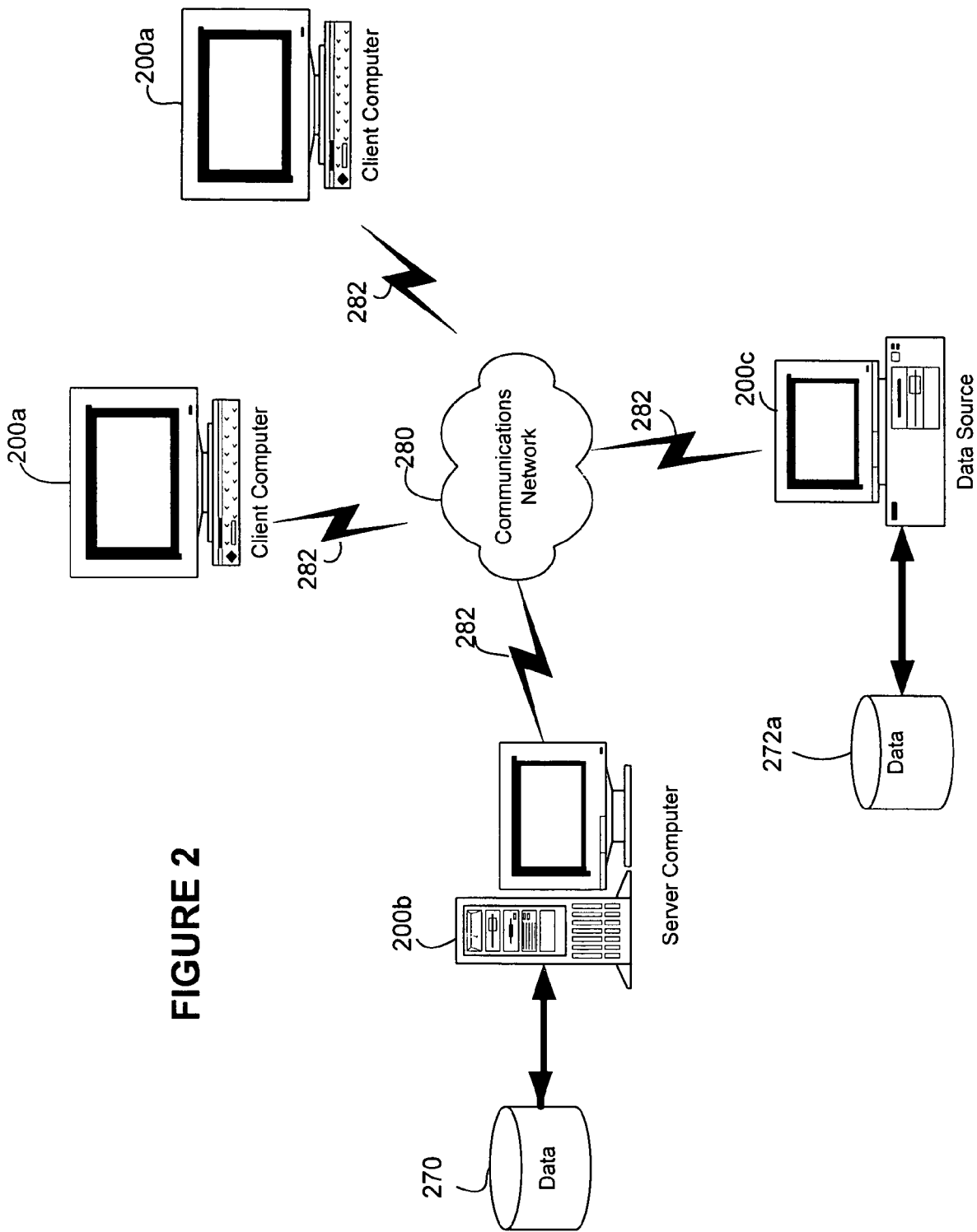
FIG. 2 is a diagram illustrating an example computer network in which aspects of the invention may be incorporated.

FIG. 2 illustrates an example network environment in which the present invention may be employed. Of course, actual network and database environments may be arranged in a variety of configurations; however, the example environment shown here provides a framework for understanding the type of environment in which an embodiment may operate.

The example network may include one or more client computers 200a, a server computer 200b, data source computers 200c, and/or databases 270, 272a, and 272b. The client computers 200a and the data source computers 200c may be in electronic communication with the server computer 200b by way of the communications network 280 (e.g., an intranet, the Internet or the like). The client computers 200a and data source computers 200c may be connected to the communications network by way of communications interfaces 282. The communications interfaces 282 can be any type of communications interfaces such as Ethernet connections, modem connections, wireless connections and so on.

The server computer 200b may provide management of the database 270 by way of database server system software such as MICROSOFT®'s SQL SERVER or the like. As such, server 200b may act as a storehouse of data from a variety of data sources and provides that data to a variety of data consumers.

In the example network environment of FIG. 2, a data source may be provided by data source computer 200c. Data source computer 200c may communicate data to server computer 200b via communications network 280, which may be a LAN, WAN, Intranet, Internet, or the like. Data source computer 200c may store data locally in database 272a, which may be database server or the like. The data provided by data source 200c can be combined and stored in a large database such as a data warehouse maintained by server 200b.

Client computers 200a that desire to use the data stored by server computer 200b can access the database 270 via communications network 280. Client computers 200a access the data by way of, for example, a form, a query, etc. It will be appreciated that any configuration of computers is equally compatible with an embodiment of the present invention.

Example Embodiments

In the discussion that follows, it is assumed that one skilled in the art has familiarity with the syntax of databases, such as the syntax used in SQL SERVER and the like, and therefore details relating to such syntax are omitted herein for purposes of clarity. In addition, while the examples provided herein are described in connection with SQL SERVER syntax, it will be appreciated that an embodiment is equally applicable to any type of database program, syntax, application or the like. Furthermore, while some examples herein refer to databases used in connection with electronic commerce, it should be appreciated that an embodiment is equally applicable to a database that is used in connection with any field of endeavor for any purpose.

As discussed above, conventional database backup systems require that all filegroups and metadata of a database be backed up and restored prior to bringing a database online. An embodiment provides a mechanism for bringing a subset of an entire database online so as to decrease the time required to return a database to service. The subset may, in an embodiment, only contain database metadata and a filegroup. It will be appreciated from the discussion that follows that additional filegroups may be brought back online after the database itself, so that a full database restoration is also contemplated by an embodiment.

Figure 3A:
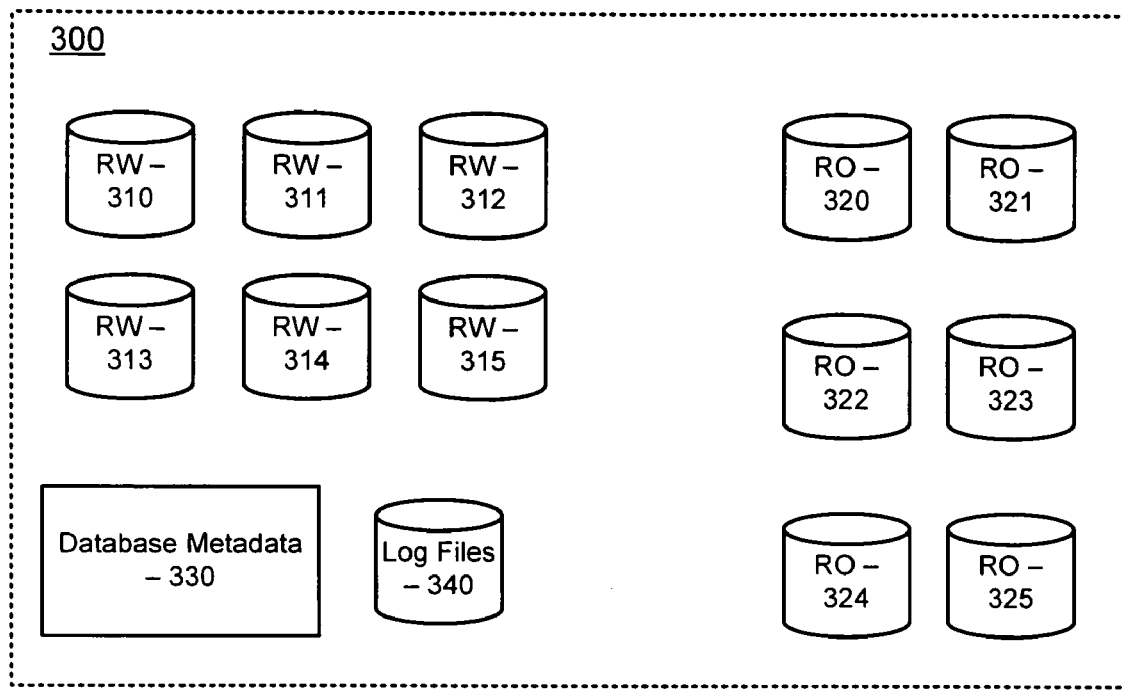
FIG. 3A is a block diagram illustrating an example database in which aspects of the invention may be implemented.

For purposes of explanation, FIG. 3A illustrates an example database in which aspects of the invention may be implemented. Referring now to FIG. 3A, database 300 may include read-write filegroups 310-315 and read-only filegroups 320-325. It will be appreciated that read-write filegroups 310-315 may include any type of files, data or the like that permit both reading and modification of their contents. Likewise, read-only filegroups 320-325 may be any type of files, data or the like that only permit reading of their contents. In addition to filegroups 310-325, database 300 may include database metadata 330, which may be any type of data that may be used to identify and access the various filegroups 310-325.

Database 300 may also include log files 340. Log files 340 may include information that indicates a modification to a filegroup 310-325, the time at which a filegroup 310-325 was last archived (i.e., saved to a non-volatile storage medium), the time at which a read-write filegroup was made read-only or vice-versa (if applicable), and so forth. As may be appreciated, therefore, log files 340 may include any type of information that describes filegroup 310-325, an operation performed on such filegroups 310-325 or the like. For example, log files 340 may include a log sequence number that indicates a time at which a filegroup 310-325 was last archived. The log sequence number may, alternatively, include a number or other identifier that simply increases every time filegroup 310-325 is archived. As may be appreciated, the log sequence number may contain any type of information to indicate how recently a particular filegroup 310-325 was archived.

Figure 3B:
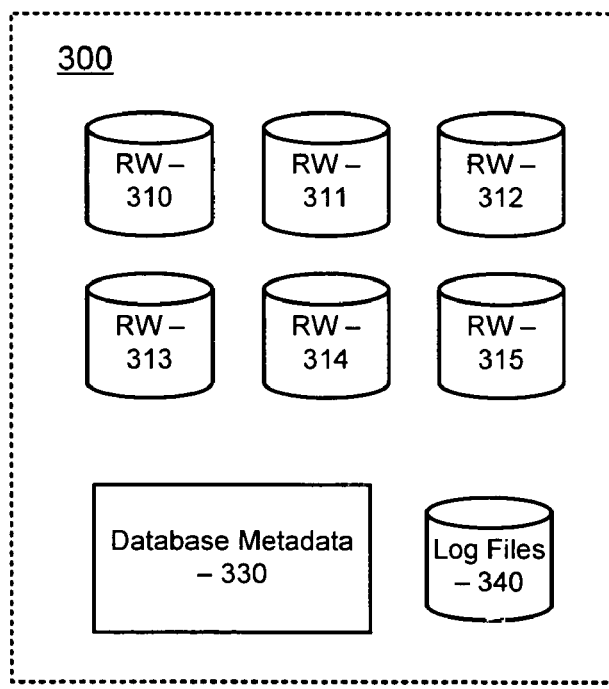
FIG. 3B is a block diagram illustrating an example restored database according to an embodiment of the invention.

As noted above, an embodiment permits a database 300 to resume operations in a partially-restored state. An example of such a partially-restored state is illustrated in FIG. 3B, which illustrates only the components that are online. Referring now to FIG. 3B, database 300 can be seen, having log files 340, database metadata 330 and read-write filegroups 310-315. Because of their absence, it can be seen in FIG. 3B that read-only filegroups 320-325 are not online. It will be appreciated that the illustration of FIG. 3B is merely for purposes of explanation and that, as will be discussed below, the configuration of restored database 300 may take any form, and may include any number or type of read-write filegroups 310-315 and/or read-only filegroups 320-325 (not shown in FIG. 3B for clarity).

Figure 4:
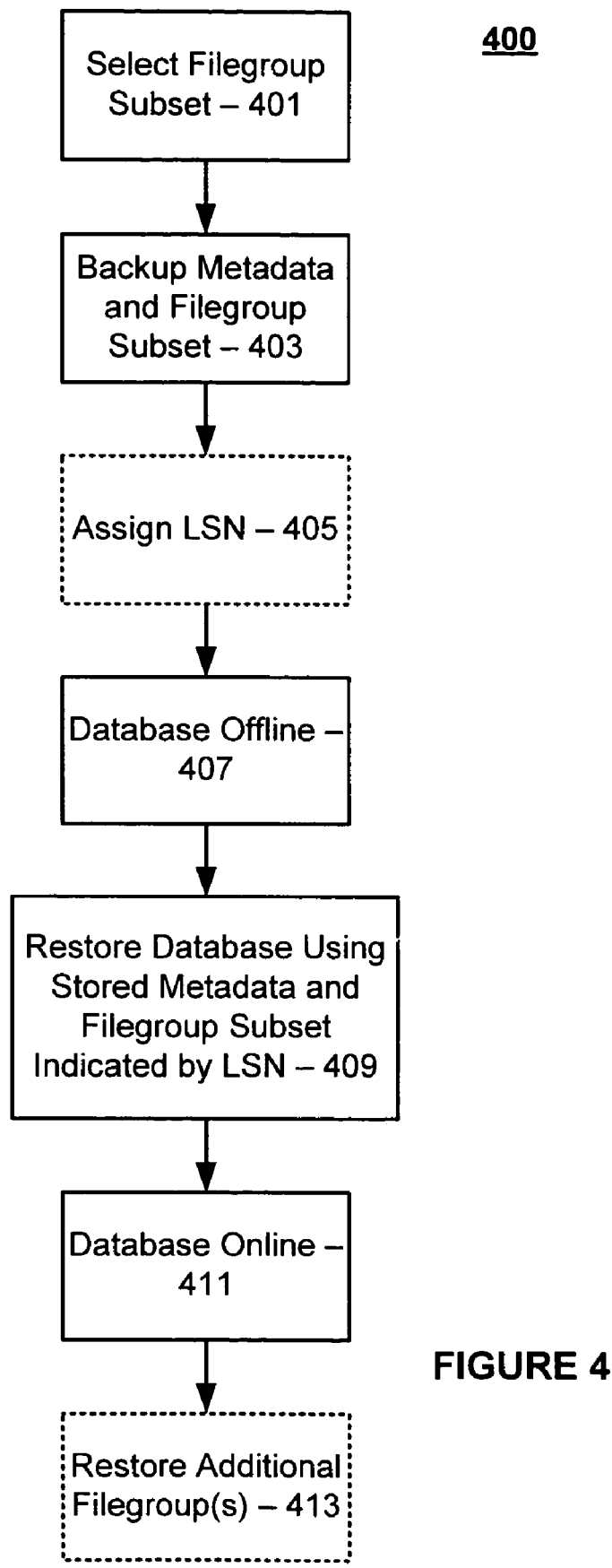
FIG. 4 is a flowchart illustrating an example method of restoring a database according to an embodiment.

Now that an example database 300 and restored database 300 has been described in connection with FIGS. 3A-B, an example method of restoring a database according to an embodiment will now be discussed in connection with FIG. 4. Turning now to FIG. 4, example method 400 according to an embodiment is illustrated.

At step 401, a filegroup subset of a database is selected. It will be appreciated that any criteria may be used for such selection. For example, the minimum number of filegroups that are necessary for a database to perform its most important function(s) may be selected so the database may be brought back online as quickly as possible. In another embodiment, a database user may be willing to trade-off a certain amount of time to bring a database online in exchange for a greater number of filegroups, even if such filegroups are not absolutely essential. In yet another embodiment, only read-write filegroups are selected. Thus, it can be seen that any number or type of database filegroups may be selected in connection with step 401, and that the filegroups so selected may, in an embodiment, ultimately be used to restore the database in step 409 below.

At step 403, a subset of the database, including the filegroup(s) selected in connection with step 401 and database metadata, may be backed up (i.e., archived or the like) to some form of non-volatile storage, such as a hard drive, CD-ROM, DVD and so forth. Step 403 may be performed on-demand, periodically according to some predetermined schedule, or the like. As should be known to one of skill in the art, any syntax that is appropriate to the database may be used to perform step 403. An example of such syntax may take the form:

BACKUP DATABASE sampleDb READ_WRITE_FILEGROUPS

In the above example, the syntax READ_WRITE_FILEGROUPS is used to back up only the database filegroups of a database called sampleDb that are read-write. Thus, it will be appreciated that the above example syntax may be used when the selection performed in connection with step 401 was for all read-write filegroups.

It will also be appreciated that in some embodiments, steps 401 and 403 may be combined into a single step that either backs up the entire database or that backs up a subset of the database that is larger, or otherwise different, than the subset of the database that will be used in connection with step 409 to restore the database. As will be discussed in connection with step 409 below, an embodiment can select appropriate portions of the database to restore from amongst archived data.

At optional step 405, a log sequence number may assigned to each filegroup to indicate a time at which the filegroup was backed up. Thus, if more than one copy of a filegroup is available, a system on which the database is running could determine the most up-to-date version. Alternatively, and as noted above, the log sequence number may be used to, for example, record the last time at which a filegroup was made read-only.

At some point, signified by step 407, the database goes offline or otherwise encounters a fault that requires the database to be restored. As may be appreciated, such a fault may be due to power loss or fluctuation, software error or crash, user error, etc. The database may also be brought offline in a controlled manner because of a planned outage or due to an emergency, for example.

At step 409, the database is restored using the stored database metadata and the filegroup subset that was saved in connection with step 403. An example syntax that may be used to accomplish step 409 may take the form:

RESTORE DATABASE sampleDb WITH PARTIAL

In the above example, the WITH PARTIAL syntax can, according to an embodiment, be used to partially restore a database. This is as opposed to the conventional use of the WITH PARTIAL syntax, which permitted a partial restore from only a full backup and rendered permanently offline any filegroups that were not part of the partial restore. Furthermore, and as was noted above, the filegroup subset that is used to restore the database in step 409 may differ from the subset that was backed up in connection with step 403, above. Thus, in an embodiment any combination of read-write and read-only filegroups may be a part of a partially-restored database. For example, an electronic commerce application of a database may require two read-write filegroups and one read-only filegroup to be able to handle incoming customer orders. Thus, such a subset of an entire database may be restored. Therefore, an embodiment allows a user or the like to select one or more filegroups to restore from amongst any number of archived filegroups, including a complete backup of the database.

At step 411, the database may be brought back online in a partially-restored status. At optional step 413, filegroups that were not restored in connection with step 409 and were therefore not brought back online at step 411 may be restored and ultimately brought back online. In one embodiment, the subset of database filegroups may be restored to the same system on which the database was running prior to going offline. In such an embodiment, the filegroup(s) that were not restored may be restored at a later time, either periodically, as-needed, or according to some other criteria. When bringing such a filegroup online, a determination may be made as to whether any of a possible plurality of stored filegroups are current, as determined by the log sequence number. For example, such a system may have a copy of the filegroup in memory, as well as an archived copy of the same filegroup. In such a case, the system may use the log sequence number to determine the most recent version of the filegroup, and then bring the most recent version online.

In another embodiment, the subset of database filegroups may be restored to a different system from that which the database was running prior to going offline. As was the case in the embodiment discussed above, the filegroup(s) that were not restored may be restored at a later time, either periodically, as-needed, or according to some other criteria. As may be appreciated, however, the different system that is going to run the database may not have any saved filegroups, but the unrestored filegroups may be accessible by way of their database metadata. In either case, the restoration of additional filegroups may be performed while the database is offline or online.

While the present invention has been described in connection with the embodiments of the various figures, it is to be understood that other similar embodiments may be used or modifications and additions may be made to the described embodiment for performing the same function of the present invention without deviating therefrom. Therefore, the present invention should not be limited to any single embodiment, but rather should be construed in breadth and scope in accordance with the appended claims.

What is claimed:

1. A method of restoring a database, comprising:
   selecting, for backup, at least two filegroups comprising a subset of a database, the database comprising a plurality of different filegroups, each filegroup comprising a discrete set of files or data, the subset comprising the at least two filegroups and database metadata describing the at least two filegroups, wherein the selection is based upon user-specified criteria related to the at least two filegroups and wherein the at least two selected filegroups include at least one filegroup required to partially restore the database and at least one filegroup that is not essential to partially restore the database, wherein the at least two selected filegroups are selected for backup based on a user-selected amount of time required to restore the at least two filegroups;
   creating a backup of the subset of the database;
   restoring the database subset and operating the database with the subset, wherein the database is able to resume operations in a partially-restored state; and
   restoring one or more additional filegroups after the database has been operating with the database subset.

2. The method of claim 1, wherein the at least two filegroups comprises a plurality of read-write files.

3. The method of claim 1, wherein creating a backup of the subset of the database comprises saving the database metadata and the at least two filegroups to a non-volatile storage medium.

4. The method of claim 1, wherein the one or more additional filegroups comprises a plurality of read-only files.

5. The method of claim 4, further comprising assigning a log sequence number to the one or more additional filegroups and creating a backup of the one or more additional filegroups.

6. The method of claim 5, wherein the log sequence number corresponds to a time at which the one or more additional filegroups are made read-only.

7. A method for restoring a database, comprising:
   archiving at least two filegroups of a database having a plurality of filegroups, each filegroup comprising a discrete set of files or data, wherein each of the at least two filegroups is selected based upon user-specified criteria related to the at least two filegroups, wherein the at least two selected filegroups includes at least one filegroup required to partially-restore the database and at least one filegroup that is not essential to partially restore the database, wherein the at least two selected filegroups are selected based on a user-selected amount of time required to restore the at least two filegroups;
   accessing archived database metadata and the at least two archived filegroups;
   bringing the at least two filegroups online using the database metadata and operating the database with the at least two filegroups, wherein the database is able to resume operations in a partially-restored state; and
   bringing additional archived filegroups online after the database has resumed operations with the at least two filegroups.

8. The method of claim 7, further comprising:
   accessing one of the additional archived filegroups and a log sequence number associated with the accessed filegroup; and
   bringing the accessed filegroup online if the associated log sequence number indicates that the accessed filegroup is the most recent version of the accessed filegroup.

9. The method of claim 8, wherein the at least two filegroups and the additional archived filegroups are selected from a plurality of archived database filegroups.

* * * * *